(12) United States Patent
Olsson et al.

(10) Patent No.: US 7,680,672 B2
(45) Date of Patent: Mar. 16, 2010

(54) EVENT COLLECTION ARCHITECTURE

(75) Inventors: Anders Olsson, La Jolla, CA (US);
Martin Liljenback, Del Mar, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 637 days.

(21) Appl. No.: 10/037,674

(22) Filed: Oct. 22, 2001

(65) Prior Publication Data

US 2002/0103664 A1 Aug. 1, 2002

Related U.S. Application Data

(60) Provisional application No. 60/242,986, filed on Oct. 20, 2000.

(51) Int. Cl.
*G06F 17/60* (2006.01)

(52) U.S. Cl. .................................. 705/1; 463/1; 463/16

(58) Field of Classification Search ...................... 705/1, 705/56, 58, 62, 64, 72; 463/1, 16
See application file for complete search history.

(56) References Cited

U.S. PATENT DOCUMENTS

| | | | | |
|---|---|---|---|---|
| 6,035,332 A | * | 3/2000 | Ingrassia et al. | ............ 709/224 |
| 6,138,155 A | * | 10/2000 | Davis et al. | ................ 709/224 |
| 6,369,840 B1 | * | 4/2002 | Barnett et al. | ................ 715/853 |
| 2002/0111865 A1 | * | 8/2002 | Middleton et al. | ............ 705/14 |
| 2009/0104954 A1 | * | 4/2009 | Weber et al. | .................... 463/1 |
| 2009/0157869 A1 | * | 6/2009 | Cleary | ........................ 709/224 |
| 2009/0192778 A1 | * | 7/2009 | Gabele et al. | ................. 703/17 |

FOREIGN PATENT DOCUMENTS

JP 363242855 A * 10/1988

* cited by examiner

*Primary Examiner*—Pierre E Elisca
(74) *Attorney, Agent, or Firm*—Robert C Kowert; Meyertons, Hood, Kivlin, Kowert & Goetzel, P.C.

(57) ABSTRACT

The present invention relates to an event tracking server that determines event tracking information related to a user's interaction with a server device on a computer network, such as a server device for a Web site. The event tracking server determines the event tracking information by first receiving an event signal from a client device associated with the user, wherein the user used the client device to interact with the server device. The event signal includes an event ID and data that describes the user's interaction with the server device. The event tracking server then retrieves a set of instructions that correspond to the event ID included in the event signal and extracts the descriptive data from the event signal in accordance with the retrieved instructions. The retrieved data is then stored in a database. The user interaction with the server device can include various actions, such as downloading a file, placing or removing an item into or from an electronic shopping cart, purchasing an item, or using a search capability of a search engine.

28 Claims, 5 Drawing Sheets

```
<!-- BEGIN WEBSIDESTORY CODE HITBOX COMMERCE v1.1 -->
<!-- COPYRIGHT 1997-2001 WEBSIDESTORY, INC. ALL RIGHTS RESERVED. U.S.PATENT
PENDING. Privacy notice at: http://websidestory.com/privacy -->
<script language="javascript">
var _ci="CUSTOMER+ID";   //customer id
var _oi="ORDER+ID";   //order id
var _sy="CITY";   //shipping city
var _so="COUNTRY";   //shipping country
var _sa="STATE";   //shipping state
var _sz="ZIP";   //shipping zip code
var _pt="PAYMENT+TYPE";   //payment type
var _pr="PRODUCT";   //comma delimited products
var _pc="PRICE";   //comma delimited prices
var _qn="QUANTITY";   //comma delimited quantites
var _bd="BRAND";   //comma delimited brands
var _ca="CATEGORY";   //comma delimited categories
var _st="SHIP+TYPE";   //shipping type
var _sp="SHIP+COST";   //shipping cost (total)
var _eacct="DM5999999999";
var _cacct="50";
var _cgn="ehg.hitbox.com";
_esv=10;_ess="u";_esc="u";_ecp="null";
var _bn=navigator.appName;if(_bn.substring(0,9)=="Microsoft"){_bn="MSIE";};
var _bv=(Math.round(parseFloat(navigator.appVersion)*100));if((_bn=="MSIE")&&(pa
rseInt(_bv)==2))_bv=301;
</script><script language="javascript1.1">_esv=11;</script>
<script
language="javascript1.2">_esv=12;_ess=screen.width+"*"+screen.height;
_esc=(document.all)?screen.colorDepth:screen.pixelDepth;
</script><script language="javascript1.3">_esv=13;</script>
<script language="javascript">function
_ecr(_x,_w){_ed=(_w=="*")?(_x.indexOf("*")):(_x.length);
if(_x.indexOf("CP=")>=0){_be=(_x.indexOf("CP=")+3)}else{return"null";}_cv=(_
x.substring(_be,_ed));
return(_cv);}_ecp=(_ecr(document.cookie,"*"));_edt=(new Date()).getHours();
_e2="https://"+_cgn+"/HG?hc=none&hb="+_eacct+"&event=true&tz=EST&eid=1&aid="
+_cacct+"&customerid=";
_e2+=_ci+"&paymenttype="+_pt+"&shippingtype="+_st+"&orderid="+_oi;
_e2+="&shipcity="+_sy+"&shipstate="+_sa+"&shipcountry="+_so+"&product="+_pr+
"&category="+_ca;
_e2+="&quantity="+_qn+"&price="+_pc+"&brand="+_bd+"&shipping="+_sp+"&shipzip
code="+_sz;
_e2+="&bn="+escape(_bn)+"&bv="+_bv+"&sv="+_esv+"&ss="+_ess+"&sc="+_esc+"&dt=
"+_edt+"&cp="+_ecp;
if (_esv==10){_t2="<img src='";_t3="' border=0 height=1 width=1>";
document.write(_t2+_e2+_t3);}else{var _hbci=new Image();_hbci.src=_e2;}
document.write("<\!--");</script><noscript>
<img
src="https://ehg.hitbox.com/
HG?hc=none&hb=DM5999999999&event=true&tz=EST&eid=EVENT+ID&aid=CUSTOMER+ID&cust
omerid=CUSTOMER+ID&paymenttype=PAYMENT+TYPE&shippingtype=SHIP+TYPE&orderid=OR
DER+ID&shipcity=CITY&shipstate=STATE&shipcountry=COUNTRY&product=PRODUCT&categor
y=CATEGORY&quantity=QUANTITY&price=PRICE&brand=BRAND&shipping=SHIP+COST&shipzi
pcode=ZIP&sv=n&ss=u&sc=u&dt=u&cp=null"
border="0" width="1" height="1">
</noscript><!--//-->
<!-- END WEBSIDESTORY CODE -->
```

EVENT COLLECTION ARCHITECTURE

REFERENCE TO RELATED APPLICATIONS

This application claims priority of co-pending U.S. Provisional Patent Application Ser. No. 60/242,986 entitled "Event Collection Architecture" by A. Olsson et al., filed Oct. 20, 2000. Priority of the filing date of Oct. 20, 2000 is hereby claimed, and the disclosure of said Provisional Patent Application is hereby incorporated by reference.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to computer network communications and, more particularly, to the collection of event data information on Web sites.

2. Description of the Related Art

When a computer network user begins a communication session over the Internet, the user can request data files from an Internet-connected computer called a file server or Web server using the hypertext transfer protocol (HTTP). These data files comprise what are commonly referred to as "pages" or Web pages. The Web pages are typically written in a type of programming code called hypertext mark-up language (HTML), extensible style sheet language (XSL), or extensible markup language (XML), and can be viewed or displayed through a graphical user interface (GUI) browser program such as "Netscape Communicator" from Netscape Communications Corporation or "Internet Explorer" from Microsoft Corporation. The network nodes and collection of such data files are commonly referred to as the "World Wide Web" or the Internet. A collection of related files under a common Internet network domain location or node is commonly referred to as a Web site. The files available at a Web site can include a mixture of text, image, video, and audio data.

A network user can request a Web site page by clicking on a link in the browser window or by typing in a uniform resource locator (URL) in the browser location toolbar. A request for a page results in a message being sent from the user's browser to the Web site server, providing the URL of the requested page. Data such as "cookies" and header information may also be sent along with such request. Typically, cookies are stored on the client system or computer, thus, when a user returns to the same Web site or Web page, the browser automatically sends a copy of the cookie back to the server. That is, when a user's browser requests a Web page from a server at a given domain, the browser also provides any cookies it has that originated from that domain. If no cookie is provided, the server can provide one with the Web page data, which the browser will store. Thereafter, when the browser again requests a page from the Web site, the browser will automatically provide the stored cookie to the server along with its request for a page.

Information may also be passed to the Web server via parameters contained as part of the URL address. For example, "HTTP://www.URLAddress.com/x.cgi?account_no=123" is a URL containing the parameter, account_no with value 123, that is passed to the Web server as part of the page request. The string "account_no=123" is also sometimes referred to as a query string. Links or hyperlinks are elements in a Web page, such as one or more words, phrases, symbols, or images that enable a user to view another page by clicking on such link. Such link may also be a link to enable the user to download a file. Links that are images are often called banners. Links are generally coded with an anchor tag that specifies the URL address of the requested data file, e.g.:

<a href="HTTP://www.URLaddress.com/requestedpage.html">...</a>.

In this example, the requested page is named "requestedpage.html", found in the domain of www.URLaddress.com.

The Internet has become an important medium of commerce so that measuring the success of commerce-related Web sites is increasingly important. Businesses have a need to know the returns on their investments in Web sites and be able to quickly respond to information related to user's interaction with their Web sites. As a result, businesses have an increasing interest in keeping track of users' interaction with their sites. Such interaction is referred to herein as event-tracking information, which includes for example, user interaction with the links clicked on a Web page or Web site, electronic shopping carts and search engines, the referring links (or entrance links), the click-thru percentage (percentage of times a link is displayed versus clicked), location of links within a Web page or window, advertisement banners, downloadable files, the types of files downloaded, and the like.

In determining the extent of such user interaction with Web sites, tools to monitor such information are difficult and time consuming to implement. Web server software applications, such as MICROSOFT® "Internet Information Server" (IIS) or NETSCAPE® "Enterprise Sever", have the capability of recording information to log files, which are not available in real time. Such log files contain HTTP request date and time, the requested URL address (including query string, if applicable), network user's IP, the referring Web page, HTTP version, and the like. Information recorded or captured in a log file, however, is dependent on the Web server software. Several pieces of information related to event-tracking information, such as the most popular link in a Web page or Web site, number of times a file is downloaded from a particular Web page, are not captured by the Web server software in its log file. Moreover, special reporting software is required in order to view the information contained in the log files in a consistent manner.

Active server pages (ASPs) can also be used to obtain information regarding a user's interaction with a Web site. When a browser requests an ASP, the Web server generates a page with HTML code and sends it back to the browser. By tracking the generation of ASPs a Web server operator can gain information regarding the various pages that a user visited on a Web site. However, such tracking only provides traffic information, such as the particular pages that the user visited, rather than information that describes how the user interacted with the pages.

From the discussion above, it should be apparent that there is a need for an event-tracking system, that captures information related to a user's interaction with a Web site, that is easy to implement and would involve very minimal changes or additions to existing or new Web sites. The present invention fulfills this need.

SUMMARY OF THE INVENTION

The present invention relates to an event tracking server that determines event tracking information related to a user's interaction with a server device on a computer network. The event tracking server determines the event tracking information by first receiving an event signal from a client device associated with the user, such as where the user client device has interacted with the server device, such as a Web page server. The event signal includes data that indicates the user's interaction with the server device. The indicating data may comprise, for example, an event ID and associated parameters and information regarding the interaction. The event tracking server then retrieves a set of instructions that correspond to the event ID included in the event signal and extracts the descriptive data from the event signal in accordance with the retrieved instructions. If desired, the retrieved data can be stored in a database. The user interaction with the server device can include various actions, such as downloading a file, placing or removing an item into or from an electronic shopping cart, purchasing an item, or using a search capability of a search engine.

The event tracking server can include several components, including a high performance server that receives incoming event signals, a load balancer that distributes the event signals, and one or more gateway modules that receive the event signals from the load balancer. The gateway modules process the event signals to parse out information contained in the event signals related to a user's interaction with the Web site. The gateway modules can then store the information in one or more databases of the event tracking server.

In another aspect of the invention, the content provider embeds event-tracking code in a Web page of the content server for which event-tracking information is desired to be captured. The Web pages embedded with such event-tracking code are then stored in a content provider server, which responds to user page requests by serving such tracking-enabled Web pages to users on the network. When a user views a tracking-enabled page, the event-tracking code causes the user's computer device to send an event signal to the event-tracking server. The gateway modules of the event tracking server then process the event signal to obtain information regarding the user's interaction with the content server.

Other features and advantages of the present invention should be apparent from the following description of the preferred embodiment, which illustrates, by way of example, the principles of the invention.

DETAILED DESCRIPTION

Figure 1:
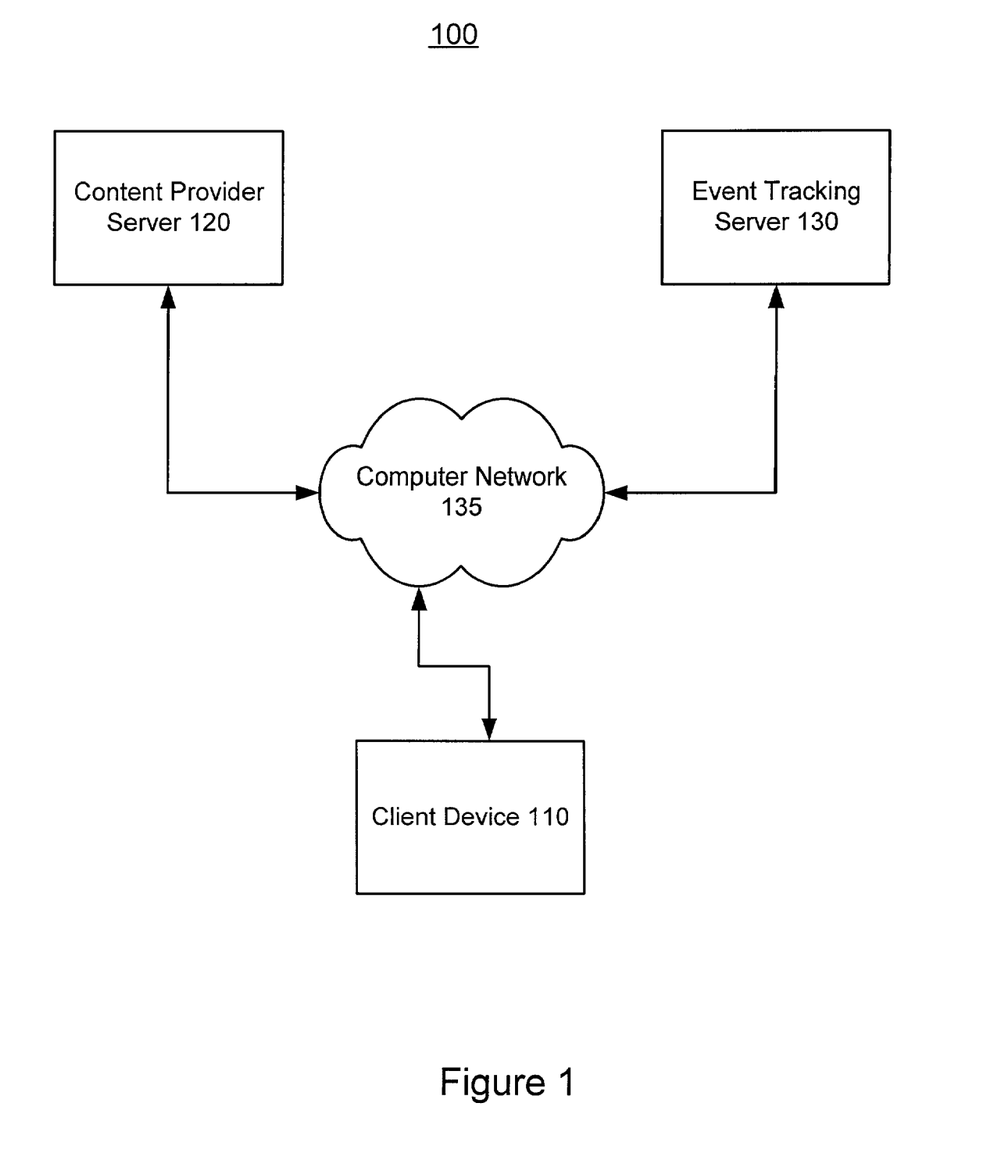
FIG. 1 is a block diagram of a system where an embodiment of an event tracking system is employed in accordance with the present invention.

FIG. 1 is a representation of an event-tracking system 100 that enables the monitoring of event-tracking information related to a user's interaction with a Web site of the system, in accordance with the present invention. The system thereby functions as an intelligent event-tracking system that captures or records event-tracking information in the form of an event signal, which contains information regarding a user event. The term "event" is used herein to refer to any user interaction between a user client device and a server device on a computer network. An event can include various actions, including a user accessing a Web site, a user selecting a link on the Web site, including exit links (i.e., links or Web pages that transferred the user to another Web site or Web page) and entrance links (or referring links, i.e., links that referred the user to the particular Web page). An event can also include a user downloading a file, placing or removing an item into or from an electronic shopping cart, purchasing an item over a Web site, and using a search capability of a search engine.

FIG. 1 is a block diagram of the event tracking system 100 in which the above-described processes may be implemented. The event tracking system 100 includes at least one client device 110, at least one content provider server 120, and an event tracking server 130, all of which are nodes of a computer network 135, such as the Internet. As used herein, the term "Internet" refers to a collection of interconnected (public and/or private) networks that are linked together by a set of standard protocols (such as TCP/IP and HTTP) to form a global, distributed network. FIG. 1 shows only a single client device and a single content provider server, although the event tracking system 100 could include a plurality of such devices.

The client device 110 can be any type of device that can be operated by a user to establish a communication link with the computer network 135. A browser software application typically resides in memory of the client device 110, as will be known to those of skill in the art. The browser software application is a software application that is used to request and display content from server devices that are linked to the computer network 135. Such content can include "World Wide Web" pages.

The content provider server 120 comprises a device that stores content and serves the content over the network 135, such as using the standard protocols of the World Wide Web. For example, the content provider server 120 may be a Web site that contains Web pages requested by users from the computer network 135. A Web page is typically comprised of a hyperlink document that is written in a descriptive markup language, such as the Hyper Text Markup Language (HTML). The content provider server 120 can include in memory a Web server software that responds to requests of the client device 110 and that handles the sending of responses back to the client device 110. The content provider server 120 may also include a data store that contains data files that are used to respond to such requests. The Web pages contained in the content provider server 120 may include links to pages or Web sites of third parties, such as sponsoring advertisers.

The event tracking server 130 can communicate with the content provider server 120 and the client device 110 via the computer network 135. The event tracking server 130 comprises one or more devices that collect event definitions related to the client device 110. An event definition is a set of data that is descriptive of a user's interaction with one or more content provider servers. An event definition typically includes data related to at least a single user interaction, such as a user placing an item in a Web site shopping cart, a user initiating a search based on a search string, or a user initiating a purchase of an item. A particular event definition includes information that describes the user interaction, such as an identification of a search string or an identification of an item placed in a shopping cart, an associated UTRL, and the time and date of the user interaction. The manner in which event definition data is collected is described in detail below.

The event tracking server 130 collects an event definition when it receives an event signal from the client device 110, wherein the event signal contains a corresponding event definition. An event signal is a data signal that is transmitted over the computer network 135 and that includes an event definition. An event signal preferably is transmitted according to the Hypertext Transfer Protocol and includes event definition data within HTTP headers and URL parameters of the signal. It should be appreciated that the event signals could also be sent according to other protocols. As described further below, FIG. 3 contains a flow diagram that illustrates how event signals are generated.

Figure 2:
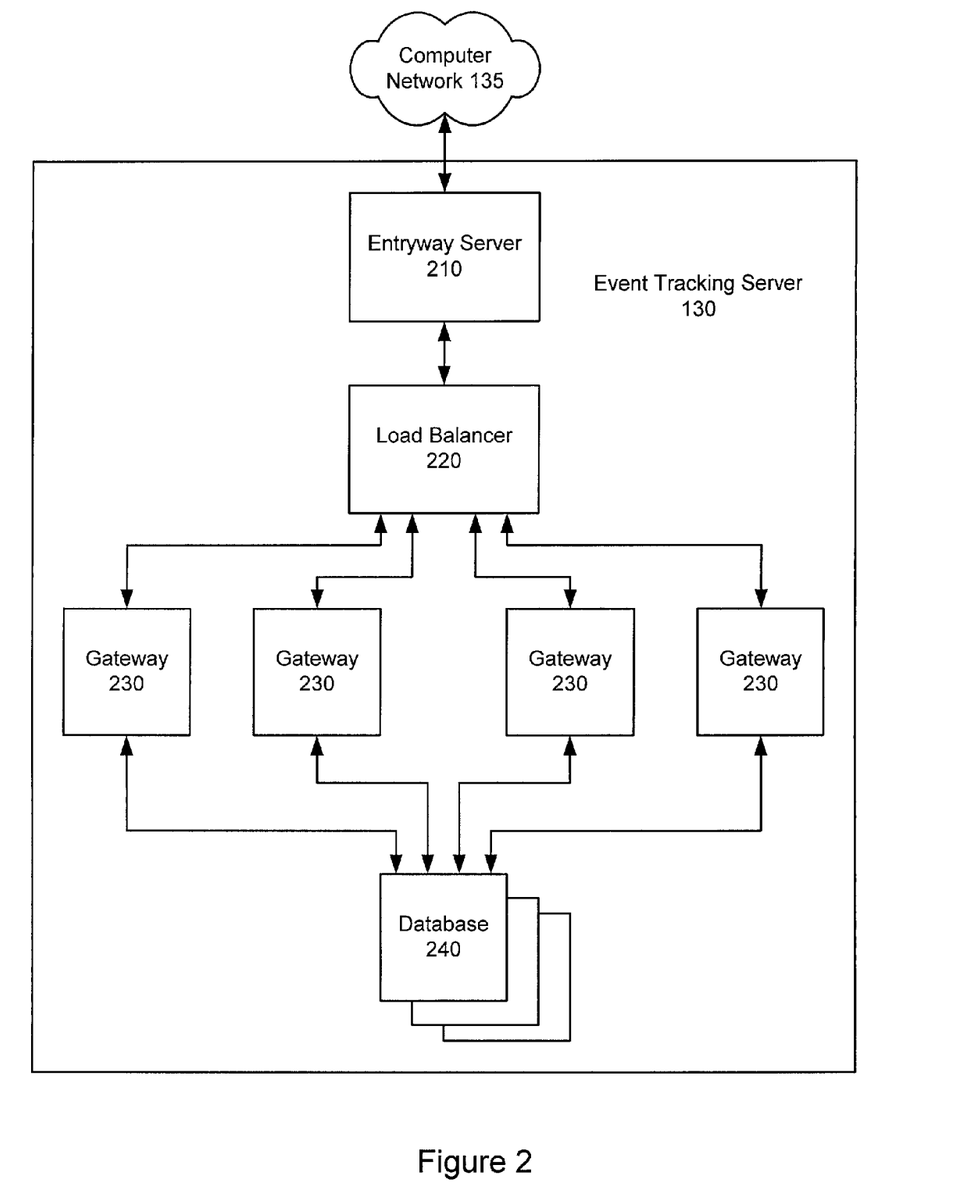
FIG. 2 is a block diagram that illustrates various components of an event tracking server of the event tracking system of FIG. 1.

FIG. 2 is a block diagram that shows the various components of the event tracking server 130. The event tracking server 130 includes a high performance entryway server 210 that acts as an entryway to the computer network 135. The entryway server 210 is the component of the event tracking server 130 that receives data from the computer network 135, including event signals. Furthermore, all data that exits the event tracking server 130 toward the computer network 135 passes through the entryway server 135.

In the preferred embodiment, the event tracking server 130 also includes a load balancer 220, which comprises a software or hardware module that receives event signals from the entryway server 210. The load balancer 220 balances the load of received event signals by distributing the received signals among several different gateway modules 230, each of which handles a load of event signals. Each gateway module is separately addressable by the load balancer 220. The load balancer 220 can balance the load in a variety of ways. In one embodiment, the load balancer 220 successively sends incoming event signals to alternate gateways 230 so that successive incoming event signals are always sent to a different gateway 230. In another embodiment, the load balancer 220 maintains a dynamic tab or count of the number of event signals that each gateway 230 is handling. When the load balancer 220 receives an incoming event signal, the load balancer 220 sends the event signal to the gateway 230 that currently has the lowest count of event signals. The load balancer 220 can also maintain data relating to whether any gateways 230 are malfunctioning so that event signals are not sent to such gateways 230. Each event is stateless, so that any event signal can be sent to any gateway 230 without effecting the processing of the signal. It should be appreciated that the event tracking server 130 could also include just a single gateway 230 that handles all incoming event signals. In such a case, the event tracking server 130 would not require a load balancer 220.

The gateways 230 are software or hardware modules that handle the processing of event signals. A gateway 230 analyzes a received event signal and obtains the event definition data stored therein regarding the corresponding event for the signal. The gateway 230 then interacts with one or more databases 240 to store the data. The gateway 230 preferably communicates with the database 240 using a database management scheme such as SQL.

The database 240 stores the event data in event-tracking files that contain records of event-tracking information. In one embodiment, the event-tracking files are stored in a relational database management system (RDBMS) such as MICROSOFT® "SQL Server" or ORACLE® "8i". The database 240 may also contain various data files, including scripts or programs containing the instructions to record the event-tracking information to the event-tracking files or to generate various event-tracking statistics or reports requested by a user. For example, the event-tracking reports or statistics may list the most popular links, banner ads with the highest clicked-thru percentage and the like.

Figure 3:
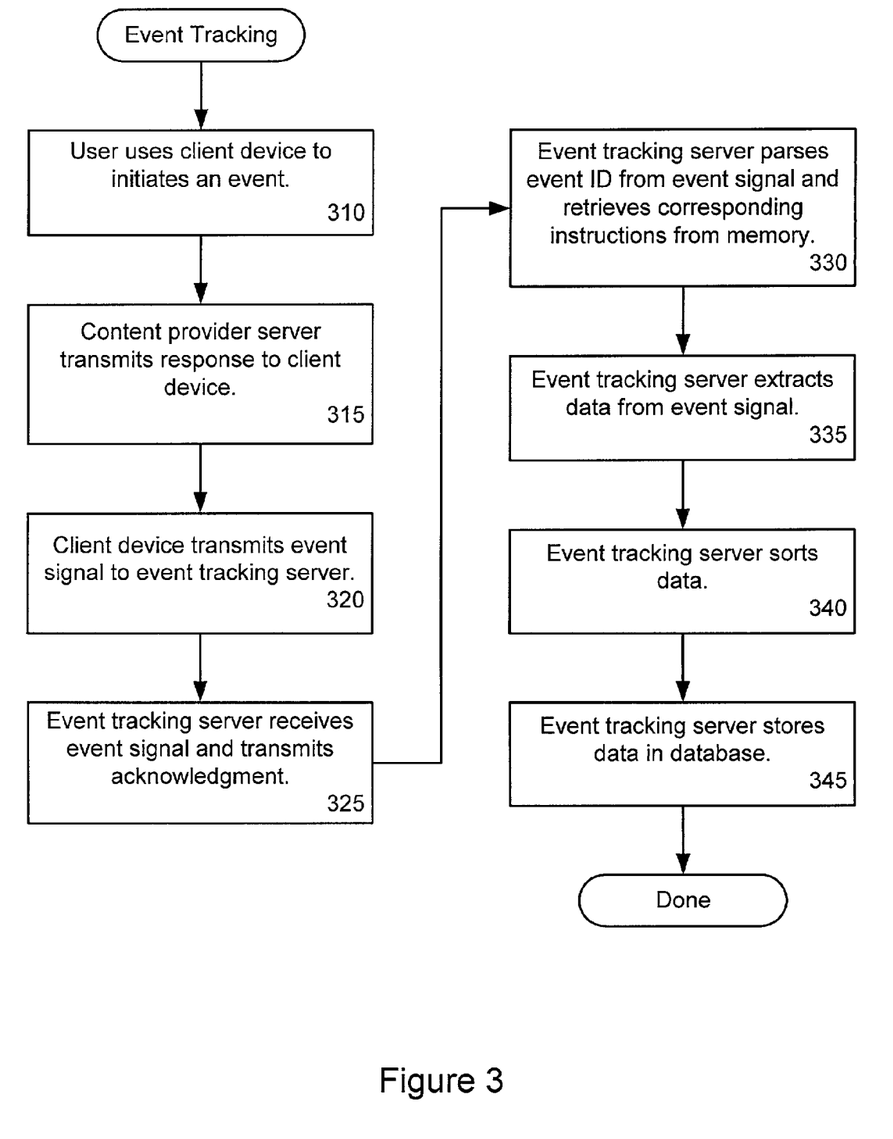
FIG. 3 is a flow diagram that describes the operations performed in obtaining and recording information related to user interaction with a content server.

FIG. 3 is a flow diagram that describes the operations performed in obtaining and recording event-related information. In the first operation, represented by the flow diagram box numbered 310, the user uses the client device 110 to initiate an event. As mentioned, an event includes any user interaction between a user client device and a server device on a computer network. An event could include a variety of different actions comprised of user interactions with the content provider server 120, such as the user launching a Web browser and requesting a Web page, placing an item in a shopping cart, removing an item from a shopping cart, initiating a search based on a search string, downloading a file, logging on or logging off, or any other interaction with the content provider server 120. The user can initiate an event by interacting with a browser application on the user's client device in a well known manner, such as by selecting a hyperlink or entering commands via the browser application.

In the next operation, represented by the flow diagram box numbered 315, the content provider server 120 transmits a response to the client device based upon the event that the user initiated in the previous operation. The response is typically in the form of the content provider server 120 transmitting a Web page to the client device 110, the Web page being a document written in a markup language such as HTML. For example, if the event related to the user making a purchase via the content provider server 120, the Web page could be a "thank you" page that acknowledges the purchase and that contains confirmatory information regarding the purchase. In another example, if the event related to the user initiating a Web search, the Web page could be a page that contains the search results. If the event was the user updating a shopping cart, then the Web page would include updated shopping cart information.

The HTML code for the Web page includes an event definition section that contains event definition data with information regarding the event that just occurred. The event definition section includes an event ID that identifies the type of event, as well as event definition data arranged in a predetermined format, with tags that denote the location of the various items of data. The data in the event definition section is preferably arranged in a particular format based on the type of event that occurred. For example, if the event that occurred comprised the user purchasing an item, then the event definition section could include a corresponding event ID and relevant information such as a description of the item, the price of the item, number of items purchased, etc, each of which are identified with a corresponding tag. The event definition data also includes data that describes the user, such as a user ID number, if any. If the event that occurred comprised the user updating a Web site shopping cart, then the event definition section could include a corresponding event ID and relevant information such as a description of the items in the shopping cart and items that were added or removed from the shopping cart. In another example, if the event that occurred comprised the user performing a Web search, the event definition section could include a corresponding event ID and relevant information such as the search string on which the search was performed. It should be appreciated that the data in the event definition section can vary based upon the type of event.

The event definition section of the Web page is preferably transparent to the user and readable by the browser application on the client device 110. The event definition section can be dynamically generated by the content provider server 120 prior to the Web page being transmitted to the client device 110. The event definition section can also be generated at the client device 110, such as in response to Java script code contained in the Web page. The event definition section can be added to any Web page for which tracking is desired, using editing techniques well known to those skilled in the art. The event definition data contained in the event definition section is typically data that is already readily available from the Web page itself, which would contain data regarding the event.

Figure 4:
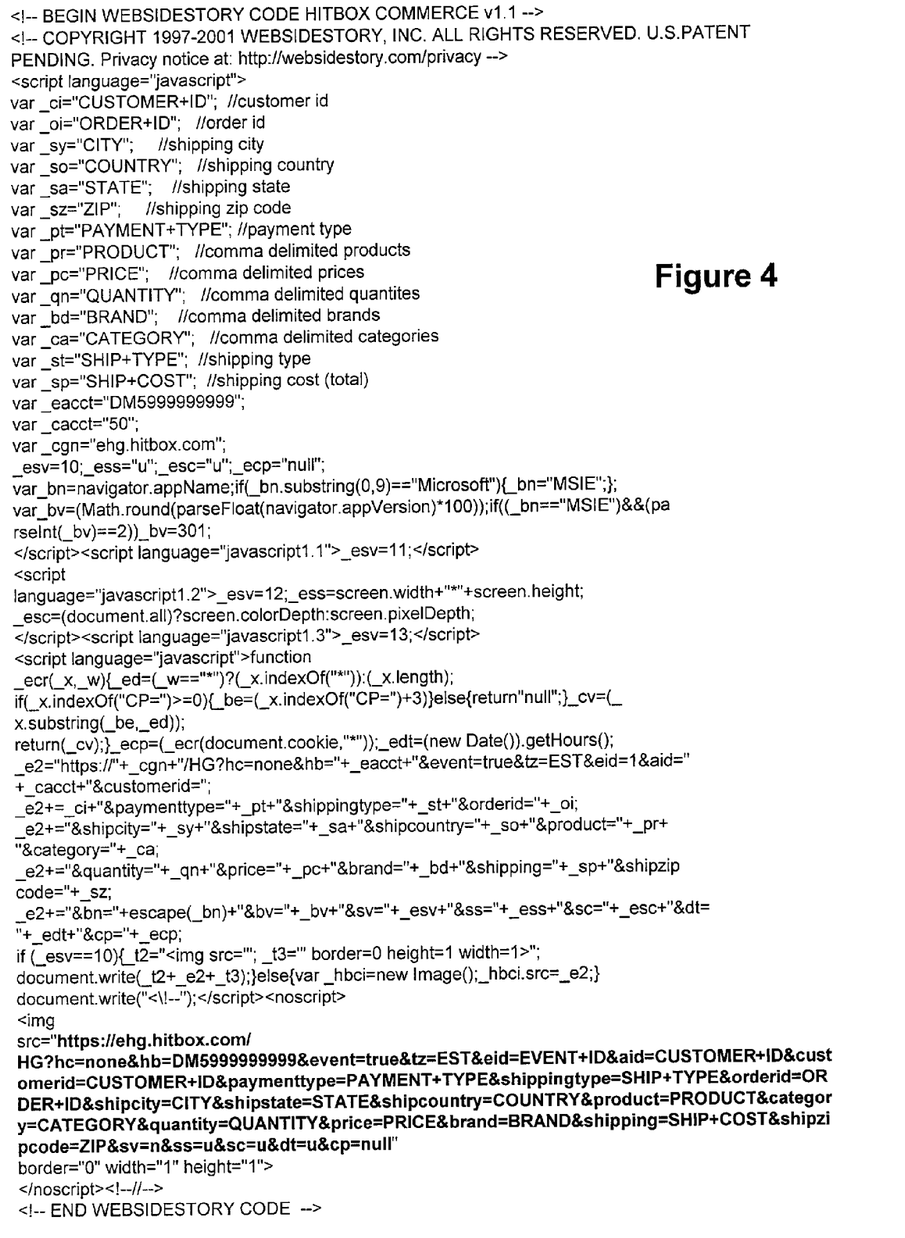
FIG. 4 shows exemplary code that comprises an event definition section of a Web page in accordance with the invention.

FIG. 4 shows a set of sample code that can form a part of the event definition section. A portion of the code (highlighted with bolded text) is in the form of a uniform resource locator that includes a plurality of data parameters with tags that delineate the parameters. An ampersand (&) symbol functions as a delimiter and separates the parameters. The "eid" parameter is the event ID parameter and the "aid" parameter is a customer ID that identifies the owner of the content provider server 120. In the sample code above, uppercase text identifies variables where actual data regarding an event is inserted. Thus, a portion of the code recites "eid=EVENT+ID", where "eid" is the tag for the event ID parameter and "EVENT+ID" is the variable for the actual event ID for the event. Such data would vary based on the event that occurred.

It can be seen that the code includes additional parameters that are particular to a type of event. The parameters include "payment type", "shipping type", "order ID", "shipping city", "shipping state" and "shipping country", "brand" and other parameters that are relevant to the event. These are parameters that relate to a commerce-type event where the user just purchased an item. The code in FIG. 3 also includes Java script code that parses additional information from the user's browser application, such as the name and version of the browser application. It should be appreciated that the quantity and types of parameters can vary based on the event and the information desired regarding the event and that the event definition section could include additional code beside the code recited above.

With reference still to FIG. 3, in the next operation, represented by the flow diagram box numbered 320, the client device 110 transmits an event signal to the event tracking server 130, wherein the event signal contains the event ID and event definition data descriptive of the event that just occurred. The client device 110 obtains the event definition data from the event definition section of the Web page just received. As mentioned, the event definition section includes an event ID and tags that denote the relevant items of information. The tags can be used to parse the relevant information from the event definition section. Preferably, the event ID, the tags and the corresponding data are included as concatenated strings in the event definition signal.

The client device 110 preferably transmits the event signal in accordance with instructions that are contained in an event tracking code that is embedded in the Web page for which event data is desired. In an HTML file, for example, the code may be written anywhere between the start body tag, "<body>", and end body tag, "</body>". Similarly, any dynamically generated Web page may have the code embedded within the body of the generated HTML file. If other file formats are used, such as XSL and XML, the end resulting page has the event tracking code embedded within the body of such file.

In one embodiment, the event tracking code contains code comprised of an HTTP image tag of the type that causes the client device 110 to automatically request a file from an identified Internet server, which in this case is the event tracking server 130. In the case of an image tag, the requested file is called an image source file. The "image source file" need not only contain image data but may also be connected to a script that is run when such file is requested. In another embodiment, the "image source file" does not contain any image data, thus a request for such image source file does not result in an image being returned by the event-tracking server 112 to the user. Such empty "image source file," however, may be connected to a script or program that is run when such image source file is requested. This process is described in more detail in the U.S. patent application entitled "Internet Website Traffic Flow Analysis", which is assigned to the same assignee as the instant application and which is incorporated herein by reference in its entirety.

The event-tracking code is preferably written such that in case the event-tracking server 130 is inoperative or inaccessible, the Web page that contains the event tracking code may still be loaded. Thus, any failure of the event tracking server 130 is transparent to the content provider server 120.

The next operation is represented by the flow diagram box numbered 325, where the event tracking server 130 receives the event signal and transmits an acknowledgement signal to the client device 110. Those skilled in the art will appreciate that the acknowledgement signal is part of the operation specified by protocols such as HTTP.

In the next operation, represented by the flow diagram box numbered 330, the event tracking server 130 parses out the event ID from the event signal and obtains a set of corresponding instructions for the event ID from memory. The event tracking server 130 preferably maintains in memory a list of all possible event IDs and a corresponding set of instructions for each ID. The instructions contain commands that the event tracking server executes to obtain event data from the event signal. The commands may vary based on the event ID. This operation is preferably performed by a gateway module 230 that was selected by the load balancer 220.

In the next operation, represented by the flow diagram box numbered 335, the gateway 230 of the event tracking server 130 then extracts data regarding the event from the event signal based on the instructions that were obtained in the previous operation. The gateway 230 identifies and extracts data from the event signal by searching for tags that are specified in the instructions obtained in the previous operation. For example, if the event ID indicates that the event related to a purchase of an item, then the instructions include commands that cause the gateway 230 to locate certain parameters tags in the event signal and extract the corresponding data, such as tags that relate to product and price parameters. The gateway 230 preferably also extracts data from the event signal related to user identification and identification of the content provider server 120.

The gateway 230 then sorts the extracted data for inserting the data into a data base, as represented by the flow diagram box numbered 340. The data is preferably stored in a table format in the database 240. The table may be comprised of a series of rows and columns, with a row containing data for a single event and the columns each including different parameters related to the event. For example, there could be a column for user ID, a column for product ID, a column for price, and so forth. The previously-obtained instructions for the event ID instruct the gateway on the destination in the table for each item of data.

The gateway 230 then stores the data in the database 240, as represented by the flow diagram box numbered 345. The gateway 230 preferably stores and sorts the data according to a query language such as structured query language (SQL). In this regard, the gateway inserts the data into one or more tables using SQL insert statements and stores the data in the database 240. The data can then be supplied to and viewed by a user.

Figure 5:
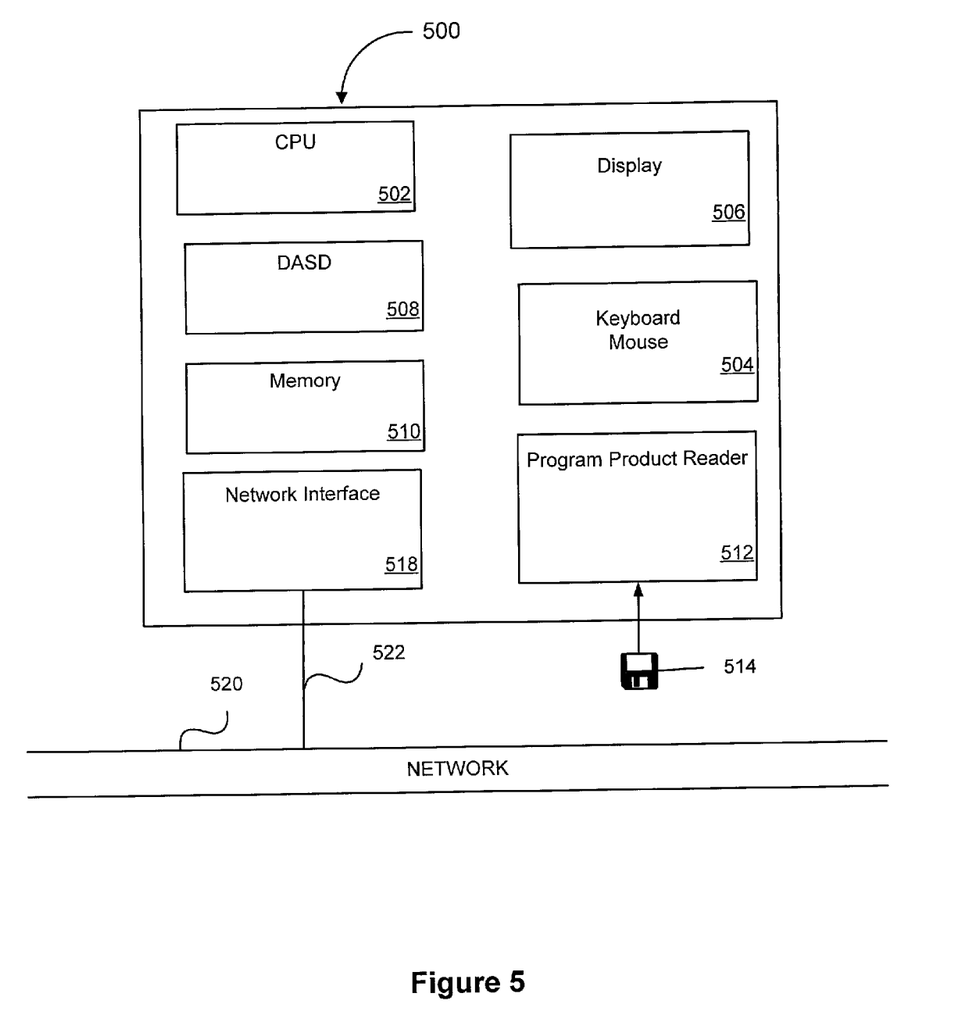
FIG. 5 is a block diagram of a computer device that is a node of a computer network shown in FIG. 1.

FIG. 5 is a block diagram of a computer in the event tracking system 100 of FIG. 1, illustrating the hardware components included in one of the computers. Those skilled in the art will appreciate that the client device 110, the content provider server 120, and the event tracking server 130 may all have a similar computer construction, or may have alternative constructions consistent with the capabilities described herein.

FIG. 5 shows an exemplary computer 500 such as might comprise any of the devices 110, 120, or 130. Each computer 500 operates under control of a central processor unit (CPU) 502, such as a "Pentium" microprocessor and associated integrated circuit chips, available from Intel Corporation of Santa Clara, Calif., USA. A computer user can input commands and data from a keyboard and computer mouse 504, and can view inputs and computer output at a display 506. The display is typically a video monitor or flat panel display. The computer 500 also includes a direct access storage device (DASD) 508, such as a hard disk drive. The memory 510 typically comprises volatile semiconductor random access memory (RAM). Each computer preferably includes a program product reader 512 that accepts a program product storage device 514, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

Each computer 500 can communicate with the others over a computer network 520 (such as the Internet or an intranet) through a network interface 518 that enables communication over a connection 522 between the network 520 and the computer. The network interface 518 typically comprises, for example, a Network Interface Card (NIC) or a modem that permits communications over a variety of networks.

The CPU 502 operates under control of programming steps that are temporarily stored in the memory 510 of the computer 500. When the programming steps are executed, the computer performs its functions. Thus, the programming steps implement the functionality of the event tracking process described above. The programming steps can be received from the DASD 508, through the program product storage device 514, or through the network connection 522. The program product storage drive 512 can receive a program product 514, read programming steps recorded thereon, and transfer the programming steps into the memory 510 for execution by the CPU 502. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 510 over the network 520. In the network method, the computer receives data including program steps into the memory 510 through the network interface 518 after network communication has been established over the network connection 522 by well-known methods that will be understood by those skilled in the art without further explanation. The program steps are then executed by the CPU 502 thereby comprising a computer process.

It should be understood that the devices 110, 120, and 130 of the computer network 135 illustrated in FIG. 1 typically have a construction similar to that shown in FIG. 5, so that details described with respect to the FIG. 5 computer 500 will be understood to apply to all computers of the system. Alternatively, the devices can have an alternative construction, so long as the computer can communicate with the other computers illustrated in FIG. 1 and can support the functionality described herein.

The present invention has been described above in terms of a presently preferred embodiment so that an understanding of the present invention can be conveyed. There are, however, many configurations for an event-tracking system not specifically described herein but with which the present invention is applicable. The present invention should therefore not be seen as limited to the particular embodiments described herein, but rather, it should be understood that the present invention has wide applicability with respect to event-tracking generally. All modifications, variations, or equivalent arrangements and implementations that are within the scope of the attached claims should therefore be considered within the scope of the invention.

What is claimed:

1. A method of determining and storing event-tracking information at an event tracking server, the event-tracking information related to the interactions of a user of a client device with a content server, where the event-tracking server, the content server, and the client device are communicatively coupled via a computer network, comprising:

receiving at the event-tracking server an event signal from the client device associated with the user, wherein the event signal comprises data that is descriptive of a user interaction with the content server and one or more tags that identify the location of one or more items of data, the event signal being sent in response to a hyper-text markup language element received by the client device from the content server, and wherein the event signal conforms to the hypertext transport protocol (HTTP) and the event signal includes event definition data in the HTTP header and uniform resource locator parameters of the event signal;

analyzing the data at the event-tracking server to identify a specific user interaction;

retrieving a set of instructions from memory of the event-tracking server that correspond to the identified user interaction;

executing the retrieved instructions at the event-tracking server to extract data from the event signal in accordance with the retrieved instructions; and storing the extracted data in a database.

2. A method as defined in claim 1, wherein the event signal includes a tag that denotes at least one item of data that is descriptive of the user interaction, and wherein the set of instructions includes an identification of the tag so that the item of data can be located in the event signal.

3. A method as defined in claim 2, additionally comprising extracting the item of data that is denoted by the tag identified in the instructions.

4. A method as defined in claim 1, wherein the event signal includes an event ID and wherein retrieving a set of instructions that correspond to the data included in the event signal comprises retrieving a set of instructions that correspond to the event ID.

5. A method as defined in claim 4, additionally comprising maintaining a list of event IDs and a set of instructions that correspond to each event ID.

6. A method as defined in claim 1, wherein a gateway module of the event-tracking server extracts the data from the event signal, and additionally comprising distributing at the event-tracking server a plurality of received event signals among several gateway modules in order to balance a load of received event signals among the several gateway modules.

7. A method as defined in claim 6, wherein the gateway modules create a data file that contains the extracted data and stores the data file in a database, and wherein the gateway module communicates with the database according to structured query language.

8. A method as defined in claim 1, wherein the event signal is received from a client device that generated the event signal in response to executing code embedded in a Web page that the client device received from the content server.

9. A method as defined in claim 1, wherein the identified user interaction comprises inserting an item into a shopping cart maintained by the content server.

10. A method as defined in claim 1, wherein the identified user interaction comprises downloading a file from the content server over the computer network.

11. A method as defined in claim 1, wherein the identified user interaction comprises conducting a search using the content server.

12. A method of determining and storing event-tracking information at an event tracking server, the event-tracking information related to the interactions of a network user with a content server, where the event-tracking server, the content server, and the network user are communicatively coupled via a computer network, the method comprising:

receiving at the event-tracking server a request from a network user which includes a request to record event-tracking information in an event-tracking file at the event-tracking server, wherein said request received is originally contained in a specially-formatted Web page on the content server that is sent to the network user and wherein said request includes the event tracking information and wherein the request is responsive to a hypertext markup language element extracted from the specially-formatted Web page;

extracting the event-tracking information from the request; and creating a record in an event-tracking file at the event-tracking server, containing event-tracking information.

13. A method as defined in claim 12, wherein the request includes an event ID, and additionally comprising retrieving a set of instructions that correspond to the event ID, wherein the instructions govern the extraction of the event tracking information from the request.

14. A method as defined in claim 13, wherein extracting the event-tracking information from the request comprises extracting the event-tracking information in accordance with the retrieved instructions.

15. A method as defined in claim 12, wherein the event tracking information relates to user interaction with a server device of the network, and wherein the server device served the specially-formatted Web page to the user.

16. A method as defined in claim 15, wherein the user interaction with the server device of the computer network comprises removing an item from a shopping cart maintained by the server device.

17. A method as defined in claim 15, wherein the user interaction with the server device of the computer network comprises downloading a file from the server device over the computer network.

18. A method as defined in claim 15, wherein the user interaction with the server device of the computer network comprises the user conducting a search using the server device.

19. A method as defined in claim 12, wherein a gateway module extracts the event tracking information, and additionally comprising distributing a plurality of received requests among several gateway modules in order to balance a load of received requests among the several gateway modules.

20. A method as defined in claim 12, wherein the record in the event-tracking file is created according to structured query language.

21. A method for tracking browsing events at an event-tracking server, the browsing events related to the interactions of a user of a client device with a content server, where the event-tracking server, the content server, and the client device are communicatively coupled via a computer network, comprising:

receiving via the network at the content server an event, the event being an interaction between a client device and the content server, the request originating from the client device;

dynamically generating at the content server an event definition section associated with the event, the event definition section including an event identifier and event definition data regarding the event that just occurred;

retrieving web page content in response to the event;

inserting the event definition section associated with the event into the web page content;

sending the web page content to the client device in response to the event;

receiving from the client device at the event-tracking server an event signal including the event definition section associated with the event;

sending an acknowledgment of receipt of the event signal;

parsing the event signal at the event-tracking server to obtain the event identifier from the event definition section;

using the event identifier to obtain an instruction from a memory of the event-tracking server;

executing the instruction at the event-tracking server to extract the event definition data from the event definition section; and storing the event definition data on the event-tracking server in a data storage area.

22. The method of claim 21, wherein the event definition data comprises a plurality of tags that denote the location of a plurality of items of data.

23. The method of claim 21, wherein the event definition section comprises a uniform resource locator.

24. The method of claim 23, wherein the uniform resource locator comprises a plurality of data parameters, where each data parameter is associated with a tag that identifies the location of its respective data parameter.

25. The method of claim 21, wherein the event definition section comprises a hypertext markup language image tag that causes the client device to automatically request a file from the event-tracking server.

26. The method of claim 25, wherein the file automatically requested by the client device in accordance with the image tag is an image source file.

27. The method of claim 26, wherein the image source file contains no image data.

28. The method of claim 25, wherein the image file automatically requested by the client device in accordance with the image tag causes the event-tracking server to perform a sequence of instructions corresponding to the requested file.

* * * * *